H. A. SWARD.
FRUIT PICKER.
APPLICATION FILED NOV. 4, 1913.
1,102,105.
Patented June 30, 1914.
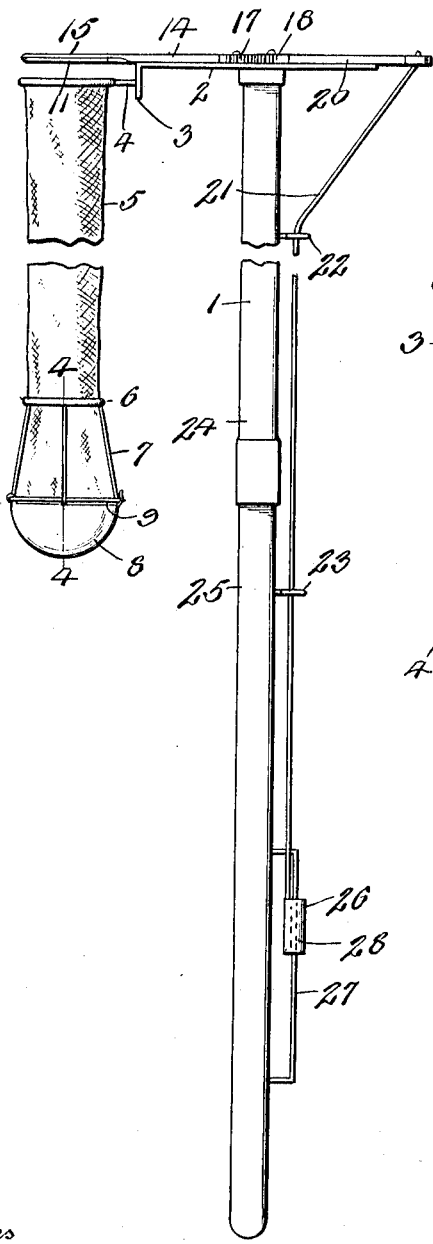
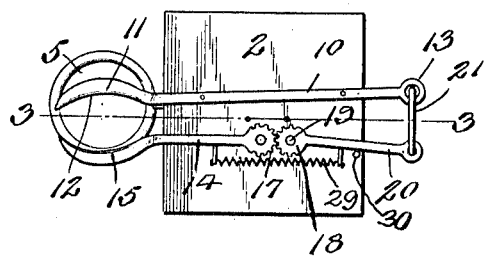
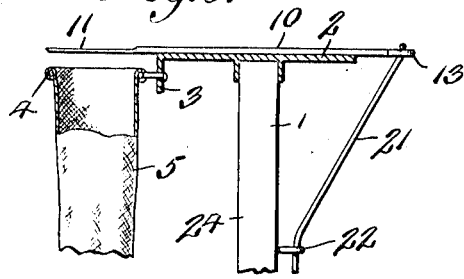
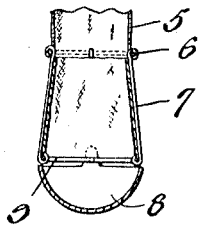
Witnesses
Inventor
H. A. Sward,
By Victor J. Evans
Attorney

UNITED STATES PATENT OFFICE.

HARRY A. SWARD, OF KIRKWOOD, ILLINOIS.

FRUIT-PICKER.

1,102,105.

Specification of Letters Patent.

Patented June 30, 1914.

Application filed November 4, 1913. Serial No. 799,201.

*To all whom it may concern:*

Be it known that I, HARRY A. SWARD, a citizen of the United States, residing at Kirkwood, in the county of Warren and State of Illinois, have invented new and useful Improvements in Fruit-Pickers, of which the following is a specification.

This invention relates to improvements in that class of fruit pickers in which a cutting or severing element is employed in connection with a flexible chute which receives the fruit as detached and conveys it to a basket arranged upon the end of the chute which may be readily opened to deliver the fruit therefrom.

The invention further consists in the novel construction, combination and operative arrangement of parts set forth in the following description and falling within the scope of the appended claim.

In the drawing there has been illustrated a simple and preferred embodiment of the improvement reduced to practice, it being understood, however, that I am entitled to such changes in minor details of construction as fall within the scope of my claim.

In the drawing: Figure 1 is a perspective view of a fruit picker constructed in accordance with my invention, Fig. 2 is a top plan view of the same, Fig. 3 is a detail sectional view on the line 3—3 of Fig. 2, and Fig. 4 is an enlarged sectional view on the line 4—4 of Fig. 1.

The picker includes a pole 1 to which is secured, at one of its ends, a substantially rectangular plate 2. The plate is provided upon one of its edges with an angular downturned portion 3 to which is secured a wire ring 4. Attached to this ring is a cloth chute 5 which has its lower end provided with a second wire ring 6, and secured to said ring is a cage or basket 7 which may be also covered with cloth if desired. The cage or basket 7 is normally closed through the medium of a flap 8 which overlies an opening in the bottom of the cage, and which may be provided with an eyelet that engages a stud provided upon the lower horizontally disposed ring or connecting member 9 of the basket.

Secured to the upper face of the plate 2 is the longitudinally extending rod 10 of the stationary cutter member 11, the said cutting member 11 being arranged directly above the ring 4 and the chute 5, the said overlying portion being curved and being provided with a cutting edge 12. The member 10 extends beyond the opposite edge of the plate and is provided with an eye 13. The movable cutting member is designated by the numeral 14, and is provided with an arcuate sharpened cutting jaw 15, which is adapted to co-act with the cutting edge 12 of the member 14, the said member 14 being pivotally connected with the plate 2. The member 14, at its pivot is formed with a flat segmental portion which surrounds its pivot, the periphery of which being formed with teeth 17 and the said teeth are adapted to mesh with the teeth of a cog wheel 18 that is pivotally secured upon the plate 2, as at 19. The cog wheel is provided with an integrally formed rearwardly extending arm 20, the said arm having its end formed with an opening to which is secured one end of a cable 21, the said cable passing through the eye 13 of the rod 10 and through suitable guides 22 and 23 upon the pole 1. The pole is preferably constructed of telescopic sections 24 and 25 respectively, the section 24 being provided with a sleeve which is adapted to receive a ferrule provided upon the end of the section 25, and if necessary, a securing element in the nature of a thumb screw may be arranged upon the sleeve to engage with the ferrule. The cable 21 has its end provided with a grip 26, the same being formed with a longitudinally extending opening indicated by dotted lines and designated by the character 28 whereby the said grip may be arranged upon the longitudinal arm of a metallic guide member 27, the said member 27 having its ends offset and secured to the pole 1. It is, of course, necessary to retain the arm 20 of the cog wheel 19 in such position as to normally spread the cutting members 12 and 15 away from each other, and to accomplish this I provide a spring 29 upon the plate 2 which exerts a tension between the members 14 and 20, and in order to limit the swinging movement of the arm 20 I further provide the plate 2 with a stop 30.

From the above description, taken in connection with the accompanying drawing, the simplicity of the device as well as the advantages thereof will, it is thought, be perfectly apparent to those skilled in the art to which such inventions appertain.

Having thus described the invention, what I claim is:

In a fruit picker, a pole, a flat rectangular plate secured centrally and at a right angle upon the end of the pole, said plate having one of its ends formed with a right angular extension, a ring connected with said extension, a chute secured to the ring, a rod arranged longitudinally of and secured to the upper face of the plate, said rod having an arcuate extension provided with a cutting edge which is disposed centrally of the mouth of the chute, the opposite end of the rod being provided with an eye, a cutting member, including an arcuate sharpened jaw disposed adjacent the cutting member of the rod, said cutting member having its end rounded and provided with teeth and pivotally connected with the plate, a cog wheel pivoted to the plate and meshing with the teeth of the cutting member, said cog wheel having an extending arm, an operating cable connected with the arm and passing through the eye of the first mentioned rod, a spring between the pivoted cutting member and the said rod, and a stop upon the plate for the pivoted arm.

In testimony whereof I affix my signature in presence of two witnesses.

HARRY A. SWARD.

Witnesses:
A. J. SWARD,
J. W. HOUSTON.

---

Copies of this patent may be obtained for five cents each, by addressing the "Commissioner of Patents, Washington, D. C."